United States Patent [19]

Cadars et al.

[11] Patent Number: 4,595,051
[45] Date of Patent: Jun. 17, 1986

[54] CASING FOR A HEAT EXCHANGER IN AN AIR-CONDITIONER, IN PARTICULAR FOR A VEHICLE CABIN

[75] Inventors: Patrick Cadars, Montigny; Daniel LeFevre, Elancourt, both of France

[73] Assignee: Valeo, Paris, France

[21] Appl. No.: 599,686

[22] Filed: Apr. 12, 1984

[30] Foreign Application Priority Data

May 11, 1983 [FR] France ............... 83 07917

[51] Int. Cl.⁴ ........................................... F28F 13/12
[52] U.S. Cl. .................... 165/122; 165/103; 165/903
[58] Field of Search .......... 165/122, DIG. 5, 143–145, 165/98, 99, 103, 903

[56] References Cited

U.S. PATENT DOCUMENTS

| | | | |
|---|---|---|---|
| 2,808,237 | 10/1957 | Fosnes | 165/122 X |
| 3,200,609 | 8/1965 | Laing | 165/122 X |
| 3,305,665 | 2/1967 | Laing | 165/122 X |
| 4,034,804 | 7/1977 | Meijer et al. | 165/148 |
| 4,401,154 | 8/1983 | Anders et al. | 165/124 X |

FOREIGN PATENT DOCUMENTS

| | | | |
|---|---|---|---|
| 2004185 | 8/1971 | Fed. Rep. of Germany | 165/122 |
| 0010550 | 1/1979 | Japan | 165/122 |
| 0128147 | 10/1979 | Japan | 165/122 |
| 0068544 | 5/1980 | Japan | 165/122 |
| 0110837 | 8/1980 | Japan | 165/122 |
| 0025693 | 3/1981 | Japan | 165/122 |
| 0025691 | 3/1981 | Japan | 165/122 |

Primary Examiner—Sheldon J. Richter
Assistant Examiner—Randolph A. Smith
Attorney, Agent, or Firm—Dennison, Meserole, Pollack & Scheiner

[57] ABSTRACT

In an air-conditioner or heater for a motor vehicle cabin, the casing (10) housing the heat exchanger (12) proper essentially comprises an air inlet duct (26) leading to the upstream face (22) of the heat exchanger and an air outlet duct (28) leading away from the downstream face (24) of the heat exchanger. A baffle wall (38) extends adjacent to the downstream face (24) to hinder the flow of air through portions of the heat exchanger where it would otherwise flow fastest. This increases the overall efficiency of the heat exchanger.

13 Claims, 5 Drawing Figures

CASING FOR A HEAT EXCHANGER IN AN AIR-CONDITIONER, IN PARTICULAR FOR A VEHICLE CABIN

The invention relates to a casing for a heat exchanger in an air-conditioner, in particular for heating and/or cooling the cabin of a motor vehicle.

BACKGROUND OF THE INVENTION

In known manner such a casing includes a housing for receiving the heat exchanger while leaving the two large faces of its core of heat exchange tubes free for the passage of air. The casing further includes an air inlet duct leading to the upstream large face and an air outlet duct leading away from the downstream large face, together with items such as flaps or the like for controlling the temperature of the air admitted to the cabin by controlling the air flow through the heat exchanger and also for directing the air to various different outlets in the vehicle cabin. The size of the casing, and the shape it has to adopt to fit into the vehicle and connect to sources of heating and/or cooling liquid depends on the space available in the engine compartment and on the locations of various inlet and outlet fittings.

As a result, the air inlet and outlet ducts are often directed towards the corresonding large faces of the heat exchanger at oblique angles which results in a highly non-uniform distribution of air flow through the heat exchanger core. As a general rule the air flows much faster through one end of the core than it does through the other end. Thus, for a given overall flow rate, the heat exchange efficiency of the heat exchanger is generally reduced. This loss of capacity is defined in practice in terms of a matching coefficient for the heat exchanger in the casing, where the matching coefficient is the ratio of the heat exchanged on a test bench (ie. under conditions of uniform air flow) to the heat exchanged by the same heat exchanger when mounted in the casing. The matching coefficient is generally about 0.9 which is equivalent to a loss in exchanger efficiency of 10% due to its being mounted in the casing.

Preferred embodiments of the invention improve the matching coefficient of a given heat exchanger/casing combination by about 5%, without altering the nominal characteristics of the heat exchanger nor the relative orientations of the inlet and outlet ducts relative to the large faces of the heat exchanger.

SUMMARY OF THE INVENTION

The present invention provides a casing for a heat exchanger in an air conditioner, in particular for the cabin of a motor vehicle, the casing comprising a housing for receiving the heat exchanger, an air inlet duct, and an air outlet duct, each of said ducts leading to a respective one of the large faces of the heat exchanger core, with the air arriving at the upstream face of the core being so guided as to pass through the core at speeds which vary from one part of the core to another, the improvement wherein a baffle wall means is included adjacent the downstream face of the heat exchanger core over a portion of the core through which the air flow speed is highest.

In a surprising manner, placing a baffle or wall opposite to the portion of the downstream face through which the air speed was greatest, and thus creating a loss of head in this region, has the effect of making the air flow through the heat exchanger core more uniform, of reducing the overall head loss through the device, and simultaneously increasing the heat exchanging power of the exchanger as well as increasing the total quantity of air passing through it.

The baffle may extend from that end of the downstream face where the air flow was highest. It may extend over the entire length of said end or over only a portion thereof, and its width may be between 10% and 20% of the corresponding dimension of the heat exchanger core in the same direction.

The distance between the baffle and the downstream face is preferably less than half the width of the baffle.

The invention thus enables the matching coefficient to be increased by about 5% and at the same time increases the air flow through the heat exchanger by about 10%.

Director blades may be installed upstream from the upstream face of the heat exchanger core to direct the incoming air towards the portions of the core through which the air would otherwise flow more slowly. This feature, when used in combination with the said baffle, further increases the matching coefficient without reducing the air flow through the heat exchanger.

BRIEF DESCRIPTION OF THE DRAWING

Embodiments of the invention is described by way of example with reference to the accompanying drawing, in which.

MORE DETAILED DESCRIPTION

Figure 1:
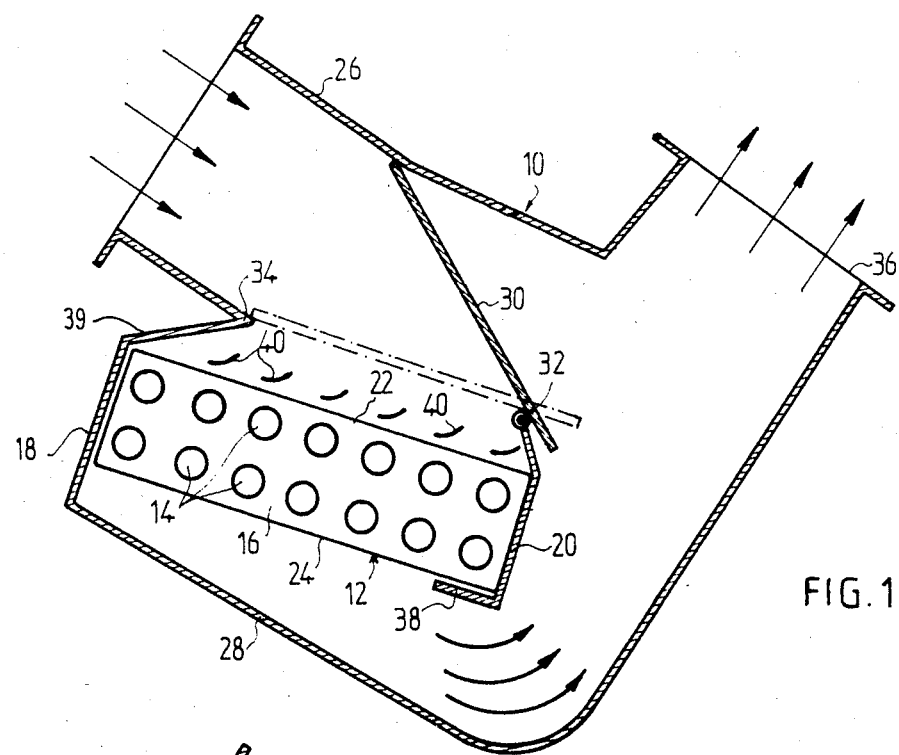
FIG. 1 is a diagrammatic section through a casing in accordance with the invention.

In FIG. 1, 10 designates a casing which forms a part of an air-conditioner for a motor vehicle cabin. It includes a housing for receiving a heat exchanger 12 constituting, for example, a heater radiator of a type which is conventional in the motor industry, comprising a bundle or core of parallel rectilinear tube 14 (extending perpendicularly to the plane of FIG. 1) which are fitted with plane parallel fins 16 extending perpendicularly to the direction of the tubes 14. Water boxes or headers are provided at each end of the core and include means for connecting the heat exchanger to a circuit for a heating liquid to cause the liquid to pass through the tubes 14.

The housing for the heat exchanger 12 in the casing 10 comprises two parallel walls 18 and 20 which are perpendicular to the fins 16, together with at least an optional further wall parallel to the plane of the figure and extending between the walls 18 and 20. The two large faces 22 and 24 of the heat exchanger core are free when the heat exchanger 12 is in place in its housing in the casing 10, and the casing 10 provides an air inlet duct 26 and an air outlet duct 28 each of which leads to a respective one of the large faces 22 and 24 of the heat exchanger core. A flap 30 is mounted inside the casing 10 to pivot about an axis 32 at one end of the wall 20 of the housing. It is free to pivot between two extreme positions, one of which is shown in FIG. 1 in solid lines (the maximum heat position) and the other of which is shown in dash-dotted lines (the minimum heat position).

The temperature of the air admitted to the vehicle cabin is adjusted by moving the flap between these two extreme positions.

The inlet duct 26 is connected to the outlet of a blower fan or other means for blowing air (or may constitute a part of said blower outlet) and is at an oblique angle relative to the upstream face 22 of the heat exchanger core, so that the air arriving via the duct 26 (when the flap 30 is wide open as shown in solid lines) is unevenly distributed over the upstream face 22 of the core. This causes the air to pass through the core with a highly irregular distribution and speed pattern with maximum speeds through the core being located close to the wall 20 and minimum speeds being located close to the other end of the core close to the wall 18.

This uneven flow distribution becomes even more uneven when the duct 26 makes an acute angle with portion 39 of the wall 18 to constitute a shelf 34 extending in front of the upstream face 22 of the heat exchanger core to serve as a stop for the flap 30 when it is in the heater cut-off position. Providing such a shelf 34 enables a shorter flap 30 to be used, which helps to avoid the problems of rigidity and vibration sensitivity which are associated with long flaps.

When the air temperature is adjusted by means of a cook for adjusting the flow of heating or cooling fluid through the heat exchanger, the flap 30 is not fitted and it is replaced by a fixed wall which occupies the position drawn in solid lines. In such a case, a shelf 34 is pointless.

The outlet duct 28 into which the air arrives after passing through the downstream face 24 of the heat exchanger is similarly at an oblique angle relative to the downstream face and follows a bend to reach one or more air outlet orifices 36 having flaps (not shown) just upstream therefrom for directing the air flow into the vehicle cabin via a selection of openings.

This particular disposition of the ducts 26 and 28, and of the heat exchanger 12 in the casing 10 is found very often in practice because of various constraints to do with the availability of space, connections to fluid supplies, etc. It causes the air to flow very fast through the portion of the heat exchanger core which is close to the wall 20, and very slowly through the other end of the core. The fast moving air is heated relatively little as it passes through the heat exchanger core, while the slow moving air is heated much more.

In practice this results in a reduction of the heater's heating power in comparison with its heating power as measured with the heat exchanger on a test bench where the air is passed through the heat exchanger in a regular and uniform manner.

In a surprising manner, the invention increases air flow through the heat exchanger core and increases the heat transferred thereto by providing a baffle wall 38 which runs along the downstream face 24 of the heat exchanger. The baffle wall 38 extends over all or a part only of the length of the core in the region where the air flow rate through the core is highest, i.e. in the case shown, starting from the end of the core which is sealed to the wall 20.

It has been observed that satisfactory results are obtained with a baffle wall 38 extending over the full length of the core and having a width of between 10% and 20% of the corresponding size of the downstream face 24 of the core, ie. 10% to 20% of the length of the fins 16. The baffle wall 38 is preferably 15% of said length.

It is also preferable for the baffle wall 38 not to be too far away from the downstream face 24 of the core. It should extend parallel to this face at a distance which is less than half the width of the baffle wall.

The baffle wall 38 may be an integral part of the wall 20 of the casing 10, in which it constitutes a flange or rim thereon, or alternatively it may be added on and fixed inside the casing 10 by any suitable means.

In operation, the baffle wall 38 causes loss of head on the downstream face 24 of the core over that portion of the core through which the air speed is at a maximum. This has the effect of reducing the air speed in this portion of the core, thereby increasing the temperature of the air as it leaves the heat exchanger, and also increases the speed of the air flow through the rest of the heat exchanger, and thus increases the flow through the core close to the wall 18.

As a result, there is an overall increase in the matching coefficient for the heat exchanger in the casing of about 5% and an increase in total air flow through the heat exchanger 12 of about 10%, other things being equal.

To get a clearer idea, when the matching coefficient of the heat exchanger 12 in the casing 10 is 0.91, and when the air flow through the heat exchanger core is 100 mass units per unit time for a casing 10 that does not include a baffle wall 38, the matching coefficient rises to 0.96 and the flow rate rises to 108 units when a baffle 38 is fitted over the entire length of the core and extends over a width of about 20 mm. These figures are given for constant pressure upstream from the duct 26.

The matching coefficient can be further improved if director blades 40 are provided in front of the upstream face 22 of the heat exchanger to deflect the air towards the portion of the heat exchanger which is nearer to the wall 18. In the above numerical example, the combination of the baffle 38 and the blades 40 causes the matching coefficient to rise to 0.97, whereas fitting the blades 40 without a baffle 38 only rises the matching coefficient to 0.95 and reduces the air flow to 98 mass units per unit time.

Figure 2:
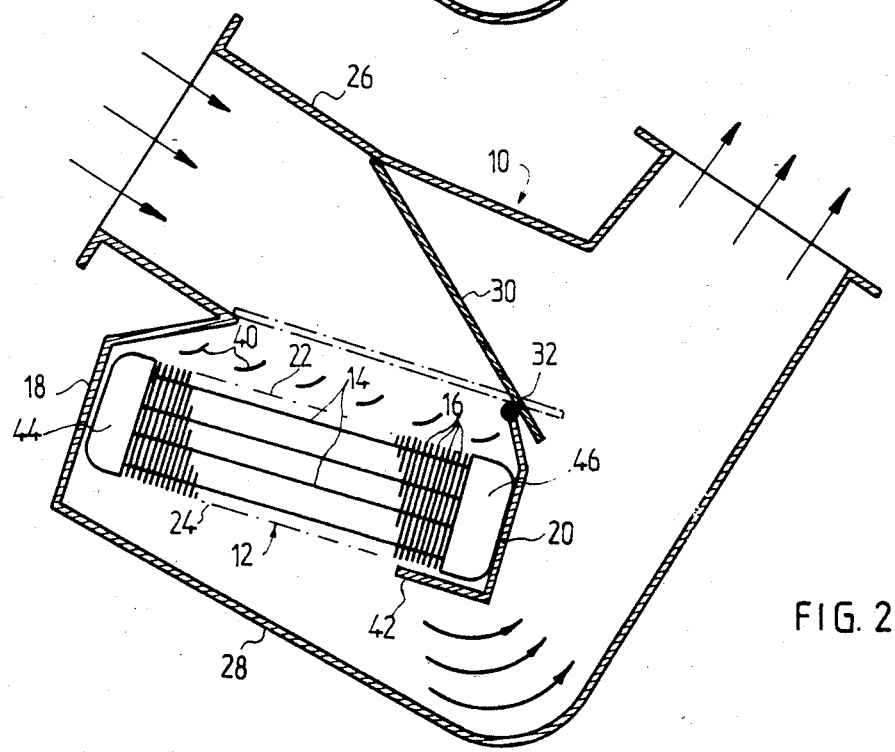
FIG. 2 is a similar view to FIG. 1, through a variant embodiment of the invention.

Reference is now made to FIG. 2, which shows a variant embodiment of the invention which differs from the FIG. 1 embodiment in that the tubes 14 of the heat exchanger core are now parallel to the plane of the figure while the fins 16 are perpendicular to this plane. The baffle wall 42 corresponding to the baffle wall 38 extends parallel to the downstream face 24 of the heat exchanger core in the region where the air speed through the core would otherwise be greatest.

The headers or water boxes 44 and 46 mounted at the ends of the heat exchanger core can be seen in FIG. 2.

Figure 3:
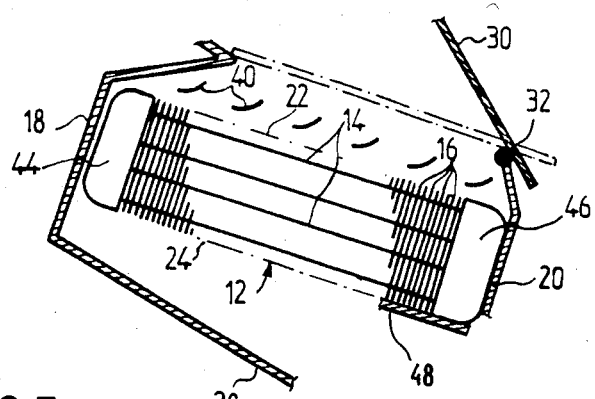
FIGS. 3, 4 and 5 show a similar view to FIG. 1, illustrating three other embodiments of the invention.
Figure 4:
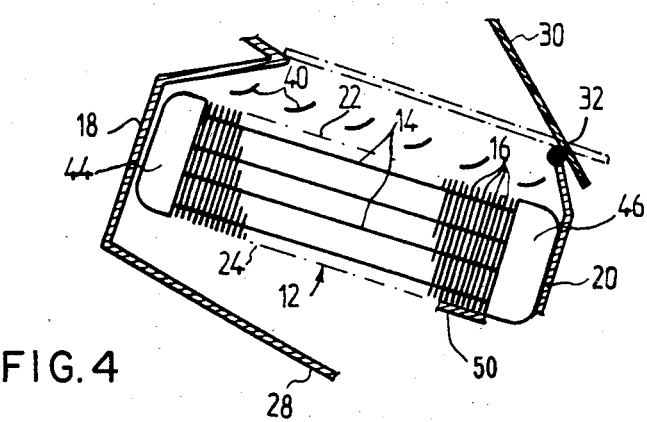

In variants of the invention, the head-loss creating means may be a wall or baffle mounted on the heat exchanger. The baffle may be on the header, as suggested in FIG. 3, in the form of a rib, or an integral part of the header. The baffle may also be snap fitted, or glued to the core as suggested at 50 in FIG. 4.

Figure 5:
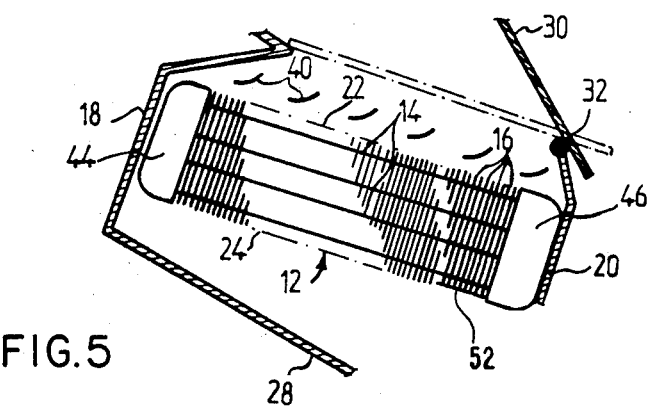

In another variant, the baffle may be defined by locally deforming the core, eg. by folding, crushing or pressing together the edges of the heat exchanger fins as suggested at 52 in FIG. 5.

What is claimed is:

1. In a heat exchanger unit for an air conditioner, in particular for the cabin of a motor vehicle, comprising:
    (a) a casing having an inlet duct and an outlet duct, each communicating with the interior of said casing and defining an air path therethrough;
    (b) a heat exchanger housing mounted in said casing for receiving a heat exchanger core; and (c) a heat exchanger core mounted in said housing across the air path, said heat exchanger core presenting two oppositely disposed large faces,
   (1) an upstream face to which the said inlet duct leads, said upstream face being disposed at an angle generally oblique to said inlet duct, and
   (2) a downstream face to which said outlet duct leads,
whereby air passing from said inlet duct, through said heat exchanger core to said outlet duct, passes through different portions of said heat exchanger core at different speeds, said speeds ranging from a maximum speed through a first portion of said core to a minimum speed through another portion of said core;
the improvement comprising a baffle wall means positioned closely adjacent said downstream face at said first portion of said core, said baffle wall means having a width which is about 10% to 20% of the corresponding dimension of said downstream face, a portion of the upstream face disposed oppositely to the baffled portion of said downstream face being substantially unbaffled closely adjacent said upstream face;
whereby a loss of head is created in the region of said core adjacent said baffle, with air flow through said core becoming more uniform, overall head loss through said core being decreased, and the heat exchanging ability of said core and total quantity of air passing through said core being increased.

2. A casing according to claim 1, said baffle wall means further providing for an increase in the quantity of air moving through the core and an increase in the heat transfer from the heat exchanger core to the air flow therethrough.

3. A casing according to claim 1, including fixed director blades adjacent the upstream face of the core for guiding the air towards the portions of the core through which it passes more slowly.

4. A casing according to claim 1, wherein the baffle wall means is an integral part of the casing in which the heat exchanger is housed.

5. A casing according to claim 1, wherein the baffle wall means is added to the casing.

6. A casing according to claim 1, wherein the baffle wall means is a part of the heat exchanger.

7. A casing according to claim 6, wherein the heat exchanger includes opposed headers, and the baffle wall means is mounted on at least one of the heat exchanger headers.

8. A casing according to claim 7, wherein the baffle wall means is constituted by a rib on a header of the heat exchanger.

9. A casing according to claim 6, wherein the baffle wall means is fixed to the heat exchanger core, by gluing.

10. A casing according to claim 6, wherein the baffle wall means is constituted by local deformation of the fins of the heat exchanger core.

11. A casing according to claim 1, wherein said baffle wall means extends from one end of the downstream face of the heat exchanger core and extends over the entire length of said end.

12. A casing according to claim 1, wherein the heat exchanger core is in the form of rows of parallel rectilinear tubes having plane fins perpendicular to the tubes, said baffle wall means being parallel to the downstream face of the core and to the direction of the tubes.

13. A casing according to claim 1, wherein the distance between the downstream face of the core and the baffle wall means is less than half the width of the baffle wall means.

* * * * *